(12) United States Patent
Zills

(10) Patent No.: US 12,514,415 B1
(45) Date of Patent: Jan. 6, 2026

(54) ELECTRIC CARPET CLEANING VEHICLE

(71) Applicant: Aaron Zills, Albert Lea, MN (US)

(72) Inventor: Aaron Zills, Albert Lea, MN (US)

( * ) Notice: Subject to any disclaimer, the term of this patent is extended or adjusted under 35 U.S.C. 154(b) by 479 days.

(21) Appl. No.: 17/974,665

(22) Filed: Oct. 27, 2022

Related U.S. Application Data

(60) Provisional application No. 63/272,569, filed on Oct. 27, 2021.

(51) Int. Cl.
  *A47L 9/00* (2006.01)
  *A47L 9/28* (2006.01)
  *B60L 1/00* (2006.01)
  *B60L 53/302* (2019.01)

(52) U.S. Cl.
  CPC .............. *A47L 9/009* (2013.01); *A47L 9/2884* (2013.01); *B60L 1/003* (2013.01); *B60L 53/302* (2019.02)

(58) Field of Classification Search
  CPC ........ A47L 9/009; A47L 9/2884; B60L 1/003; B60L 53/302
  See application file for complete search history.

(56) References Cited

U.S. PATENT DOCUMENTS

| | | | |
|---|---|---|---|
| 2009/0019662 A1* | 1/2009 | Yona | B60S 1/64 15/313 |
| 2017/0210353 A1* | 7/2017 | Stauffer | B60S 1/64 |
| 2018/0020895 A1* | 1/2018 | Betton | A47L 11/4097 15/320 |
| 2020/0047720 A1* | 2/2020 | Maeshiro | B60N 2/68 |
| 2020/0361422 A1* | 11/2020 | Maeshiro | B60H 3/024 |

FOREIGN PATENT DOCUMENTS

| | | | | | |
|---|---|---|---|---|---|
| CN | 119133643 A | * | 12/2024 | ......... | H01M 50/271 |
| KR | 102561158 B1 | * | 7/2023 | ......... | A47L 11/4005 |
| WO | WO-2013040596 A1 | * | 3/2013 | ......... | A47L 11/34 |

* cited by examiner

*Primary Examiner* — Marc Carlson
(74) *Attorney, Agent, or Firm* — Christensen, Fonder, Dardi & Herbert PLLC.; Douglas J. Christensen

(57) ABSTRACT

An electric vehicle with an installed truck-mount cleaning system comprising a plurality of operational units mounted within the vehicle. The truck-mount cleaning system includes a self-charging generator system for recharging a battery pack of the electric vehicle. During operation of the truck-mount cleaning system, the generator is electrically connected to the battery pack, electricity is transmitted from the generator to the battery pack, thereby recharging the battery pack.

17 Claims, 11 Drawing Sheets

ELECTRIC CARPET CLEANING VEHICLE

CROSS-REFERENCE TO RELATED APPLICATION

This application claims the benefit of U.S. Provisional Application No. 63/272,569, filed Oct. 27, 2021, the disclosure of which is incorporated herein by reference in its entirety.

FIELD OF THE INVENTION

The invention relates to electric trucks and vans with vehicle mounted cleaning systems having a self-charging generator system.

BACKGROUND OF THE INVENTION

Of the many floor cleaning systems available for commercial and residential use, a major segment is truck or van mounted carpet and floor cleaning systems. The vehicle in these systems travels to and parks outside the residence or facility with a floor to be cleaned and hoses are extended from the vehicle into the building. The systems installed in the vehicle have several operational components that are manufactured as a plurality of separate discrete operational units, typically three or four, that are each individually installed into a vehicle. Each one of the discrete operational units may combine one or more operational functions. The operational components are interconnected including a fluid pump, a blower for creating a suction, a suction tank for storing the retrieved cleaning fluid, a water or cleaning fluid tank, an auxiliary tank, reels for storing the hoses, a control panel, and a drive system for the fluid pump and blower.

When the floor cleaning systems are mounted in vans, the drive system for the pump and blower can be a direct drive from the vehicle engine. Such direct drive utilizes a clutch unit with a pulley mounted at the vehicle engine and connected to the main drive belt of the vehicle. A drive shaft extends from the clutch unit to a position above the floor and between the driver and passenger seats. A blower pump unit mounted to the floor behind the driver and passenger area is driven directly, through a U-joint, by the drive shaft. Hundreds if not thousands of these vans and systems have been built and many are still in use. The carpet cleaning equipment has a useful life and a replacement cost such that often the vans need to be replaced before the carpet cleaning operational units. This requires transfer of the equipment to a new van. Vehicles with such carpet cleaner systems and conventional equipment associated with vehicle mounted carpet cleaning equipment, particularly direct drive cleaning systems, are described in US Patent Publication 20200262330, which is incorporated herein by reference in its entirety.

A problem common with van installed floor cleaning systems, particularly direct drive cleaning systems, is the operational costs associated with not only traveling to job sites, but also with using the vehicle engine to run the drive system at the job site. The fuel consumption alone is a hit to any franchise on a cost basis. Where a business has a fleet of vehicles, such operational costs can be multiplied resulting in significant economic loss dramatically impacting margins.

Any improvements in ease of maintaining vehicles with floor cleaning equipment would be well received by the industry. Any improvements in the reduction of operational costs for truck or van mounted carpet and floor cleaning services would be well received by the industry. Any improvements in the ease of removal of operational units of cleaning systems mounted in vans would be welcomed by the industry.

SUMMARY OF THE INVENTION

An electric light or medium duty cargo van having a mounted cleaning system installed therein, including a self-charging generator system that recharges the battery pack of the electric vehicle while the truck-mount system is in use. In embodiments, the electric cargo van includes an electrification platform that may comprise a traction battery pack, an electric motor and electrical components to electrify the vehicle. A plurality of separate discrete operational units of the cleaning system are installed in the electric cargo van.

An electric light or medium duty cargo van having a mounted cleaning system installed therein, including a self-charging generator system that recharges the battery pack of the electric vehicle while the truck-mount system is in use. In embodiments, the electric cargo van includes an electrification platform that may comprise a traction battery pack, an electric motor and electrical components to electrify the vehicle. A plurality of separate discrete operational units of the cleaning system are installed in the electric cargo van. The separate operational units may be attached to a frame assembly. In embodiments, the cleaning system may comprise at least three discrete operational units that together provide for pumping out cleaning or rinse liquid, recovery by suction of used cleaning or rinse liquid, unused cleaning or rinse liquid storage, recovered cleaning or rinse liquid storage, dispense liquid hose storage, and vacuum suction hose storage.

In one or more embodiments, an electric cargo van with an installed cleaning system, the electric cargo van having a cargo box with a cargo floor and an electrified powertrain. In embodiments, the electrified powertrain may comprise a traction battery pack; an electric traction motor connected to the battery pack, wherein the battery pack stores electricity for use by the electric traction motor and the electric traction motor driving wheels of the cargo van; a transmission connected to the electric traction motor, wherein the transmission transfers mechanical power from the electric traction motor to drive the wheels; a first charge port electrically connected to the battery pack, the first charge port allowing the vehicle to connect to an external power supply in order to charge the traction battery pack; and a second charge port electrically connected to the battery pack, the second charge port allowing for connection to a power supply charging of the traction battery pack.

In embodiments, the installed cleaning system may comprise a plurality of discrete operational units mounted in the cargo box. The operational units may include a vacuum cleaning unit (vacuum recovery tank unit). The vacuum cleaning unit may comprise a motor; a recovery waste tank: a generator connected to and driven by the motor and comprising an electrical cord end and a generator receptacle, wherein the motor drives the generator producing electricity; and a charging cable connected to the generator at a first end and a connector at a second end, the connector configured to connect to the second charging port. During operation of the vacuum cleaning unit and when the generator is electrically connected to the battery pack, electricity is transmitted from the generator to the battery pack.

An electric light or medium duty cargo van having a vehicle mounted cleaning system installed therein and a self-charging generator system that recharges the vehicle while the truck-mount system is in use. The installed cleaning system includes discrete operational units, include a truck-mount cleaning unit, that are each individually installed into a vehicle on a mounting frame assembly. In an embodiment, the frame assembly includes a slide assembly, wherein the truck-mount cleaning unit is mounted on a slidable tray portion of the slide assembly allowing the cleaning unit to be pulled out for improved access to components of the cleaning unit. The slide-in truck-mount assembly described herein allows for greater accessibility to hoses and wiring not available with conventional installations, which would require removal of components.

A feature and advantage of embodiments is that the existing layout of carpet cleaning equipment can be utilized.

A feature and advantage of embodiments is that the electric cargo vehicle having a vehicle mounted cleaning system installed therein and a self-charging generator system that recharges the battery pack of the electric vehicle while the truck-mount system operates, and may result in an extraordinary savings in time, expense, reduction in repairs, and even the increase in the useful life of the equipment, including the vehicle.

The above summary of the various representative embodiments is not intended to describe each illustrated embodiment or every implementation of the invention. Rather, the embodiments are chosen and described so that others skilled in the art can appreciate and understand the principles and practices of the invention. The Figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

Figure 1A:
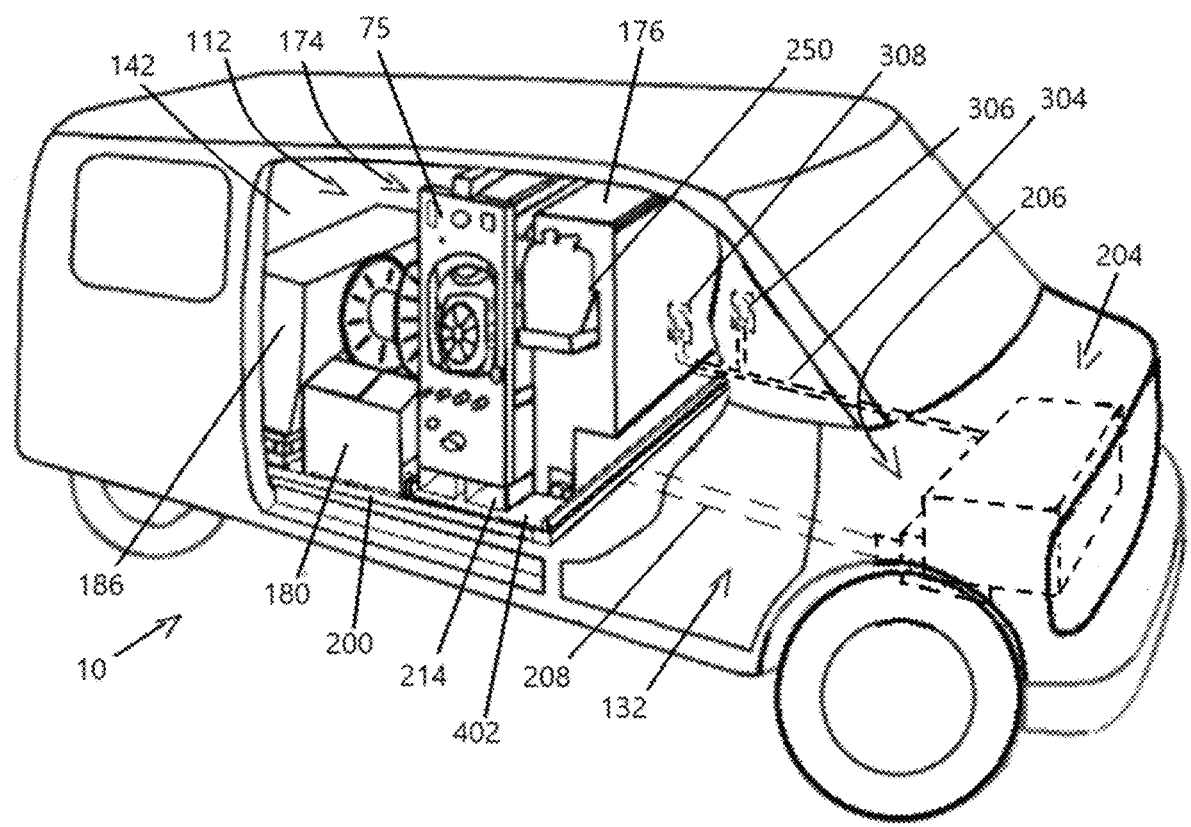
FIG. 1A is a perspective view of an electric vehicle with an installed vehicle mounted cleaning system according to embodiments of the invention

While the invention is amenable to various modifications and alternative forms, specifics thereof have been depicted by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

Figure 1B:
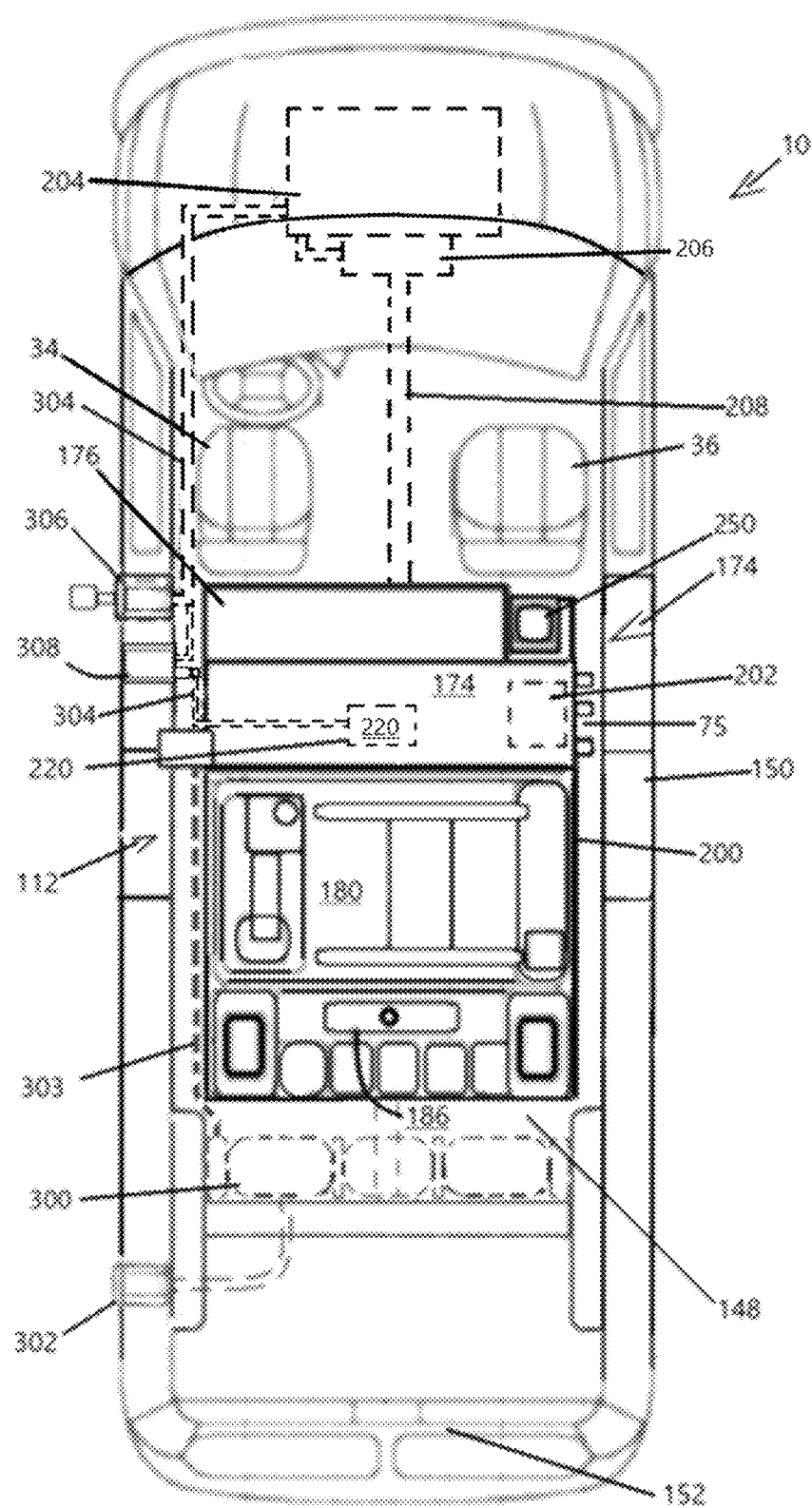
FIG. 1B is a top plan view of the electric vehicle of FIG. 1A with the roof removed, according to embodiments of the invention.

FIGS. 1A-1B illustrate an electric vehicle (EV) 10 with a vehicle mounted cleaning system 112 installed therein. In one or more embodiments, the EV 10 includes an electrification platform (electrified powertrain), including a rechargeable battery unit 204 (battery pack), a drive unit 206 (electric engine) connected to a transmission 208, a first charging port or socket 306 electrically connected to the battery unit 204 via a charging cable or line, and associated electronics. The EV 10 may include a cab area 132 including a driver's seat 34 and a passenger seat 36. Rearward of the cab is a cargo box 142 having side walls 144, 146 a cargo box floor 148, and side and rear cargo access doors 150, 152.

In one or more embodiments, the installed cleaning system 112 includes a plurality of discrete operational units. Each one of the discrete operational units may combine one or more operational functions. As depicted in FIGS. 1A-1B, the operational units may include a truck-mount cleaning unit 174 (FIGS. 3A-3C), a hose reel and liquid storage tank unit 180 (FIG. 4), which may be positioned directly rearward of the cleaning unit 174, and an auxiliary liquid tank unit 186 (FIGS. 5A and 5B) positioned in the rearward cargo area of the vehicle 10. The operational units portrayed generally reflect units commercially available. Such operational units are further described below and in US Patent Publication 20200262330, which is herein incorporated by reference, in its entirety. Various manufacturers' operational units will have particular functionalities differently arranged.

In embodiments, the operational units may be mounted on a mounting frame assembly 200 secured to the cargo box floor 148, as depicted in FIGS. 1A-1B and 6A-8. Each operational unit may be directly and separately attached to the mounting frame assembly 200. Such mounting frame assemblies are further described in US Patent Publication 20200262330, which is herein incorporated by reference, in its entirety.

In one or more embodiments, the truck-mount cleaning unit 174 (FIGS. 3A-3C) comprises an engine 202, a generator 220 connected to and driven by the engine 202, a vacuum recovery tank unit 176, and an operator control panel 75. The system may include a charging cable 304 electrically connecting the generator 220 with the rechargeable battery unit 204 of the EV 10 allowing for transmission of electrical power from the generator 220 to the battery unit 204 for recharging of the battery unit 204. In one or more embodiments, the charging cable or line 304 includes a connector at a second end, wherein the connector is connectable to a second charging port 308 that is electrically connected to the battery unit 204 via the charging cable for recharging of the battery unit 204. In embodiments, the second end of the charging cable 304 may be connected to the first charging port 306.

In embodiments, after driving the EV 10 and cleaning system 112 to and arriving at a jobsite, an operator electrically connects the generator 220 to the rechargeable battery unit 204 and performs a cleaning procedure. During the cleaning procedure and operation of the cleaning unit 174 at the jobsite, the cleaning unit engine 202 drives the generator 220, producing electrical energy. The generated electrical energy may be transmitted to the rechargeable battery unit 204 via the charging cable 304, such that the generator is a chargepoint for charging the EV rechargeable battery unit 204. After completion of the cleaning procedure, the charging cable 304 may be disconnected and the EV and the battery unit 204 is at least partially recharged allowing the EV 10 to be driven from the jobsite.

In one or more embodiments, the electric vehicle (EV) 10 is a light or medium duty cargo van having an electrification platform. In embodiments, the electrification platform or electrified powertrain, includes a battery unit 204 (battery pack or traction battery pack), the battery unit 204 being rechargeable and storing electricity for use by the electric motor; a drive unit 206 (electric motor), the drive unit 206 using power from the battery unit 204 to drive the vehicle's wheels; a drive axle 208 and electrical components to electrify the vehicle.

In embodiments, the EV 10 may further include one or more charge ports 306, 308, the charge ports allowing the vehicle to connect to an external power supply and, during operation of the cleaning system 112, the generator 220 to charge the battery unit 204; an electric transmission for transferring mechanical power from the electric traction motor to drive the wheels; and an onboard charger, wherein the onboard charger takes incoming AC electricity supplied via the charge port and converts it to DC power for charging the traction battery and, in embodiments, may communicate with the charging equipment and monitors battery characteristics such as voltage, current, temperature, and state of charge while charging the battery unit 204.

In one or more embodiments, the EV 10 may further include a power electronics controller for managing the flow of electrical energy delivered by the traction battery and for controlling the speed of the electric traction motor and the torque it produces; at least one battery (auxiliary battery or all-electric auxiliary) that provides electricity to power vehicle accessories; a DC/DC converter, which converts higher-voltage DC power from the traction battery pack to the lower-voltage DC power needed to run vehicle accessories and recharge the auxiliary battery; and a thermal system (cooling) that maintains a proper operating temperature range of the engine, electric motor, power electronics, and other components.

Figure 1C:
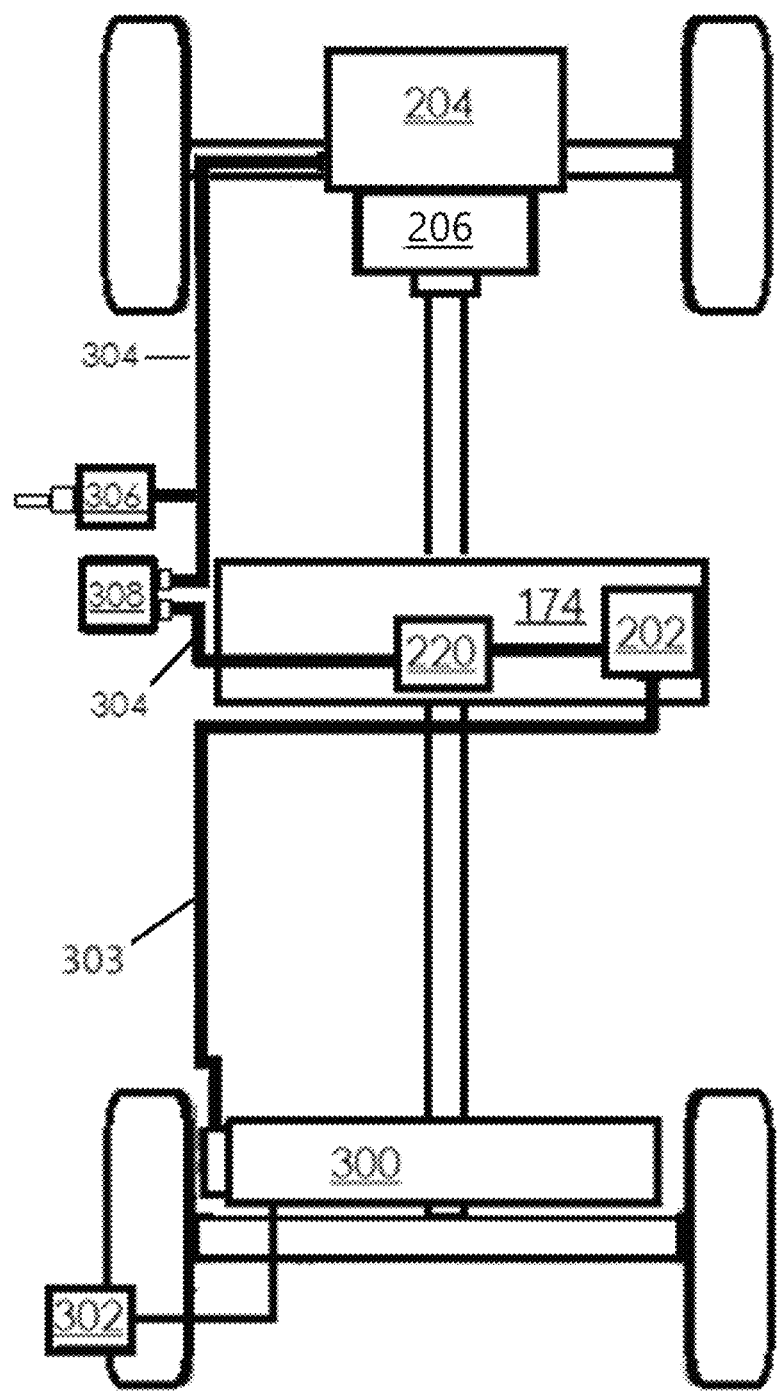
FIG. 1C is a plan schematic view of an electric vehicle with an installed truck-mount cleaning unit, according to embodiments of the invention.

In one or more embodiments, an EV 10 having an installed cleaning unit 174, as depicted in FIG. 1C. The EV 10 may be a converted gasoline or diesel vehicle having an electrification platform, including a battery unit 204, a drive unit 206 and electrical components to electrify the vehicle. In embodiments, the converted EV may include, or maintain, a fuel tank (gasoline/diesel) 300 which may be used to store fuel on board the vehicle until it's needed by the cleaning unit 174 or vehicle engine (if vehicle includes/maintains an internal combustion engine); a fuel receptacle 302 in fluid communication with the fuel tank(s) for receiving a nozzle from a fuel dispenser for filling the fuel tank.

In one or more embodiments, the EV 10 includes or maintains, in the instance of a converted gasoline/diesel vehicle, a fuel tank 300 that stores gasoline on board the vehicle until it's utilized by the cleaning system 112 and may include a fuel line 303 for providing fluid communication between the tank 300 and the cleaning system 112.

In embodiments, the electric vehicle (EV) may be a conventional electric vehicle modified for electrical communication with the generator 220 of the installed vehicle mounted cleaning system 112 for remote charging of the EV battery unit 204 for powering the electric drive unit 206 (electric traction motor). Electric vehicles (EVs) generally include all-electric vehicles—also referred to as battery electric vehicles (BEVs); plug-in hybrid electric vehicles (PHEVs) and hybrid electric vehicles (HEVs). EV's also include vehicles incorporating an electrification platform, as discussed herein. EV's use electricity to improve vehicle efficiency. These vehicle types are sometimes called electric cars, electric vehicles, or simply EVs even though some use liquid fuels in conjunction with electricity. PHEVs and BEVs may also be referred to as plug-in electric vehicles (PEVs).

Battery electric vehicles (BEVs) are powered solely by an electric battery, with no gas engine parts. Hybrid Electric Vehicles (HEVs) use an electric motor to assist gas-powered engines. Plug-in Hybrid Electric Vehicles (PHEVs) are similar to a hybrid, but with a larger battery and electric motor. PHEVs) have a gas tank and a charging port for charging the battery.

Figure 2A:
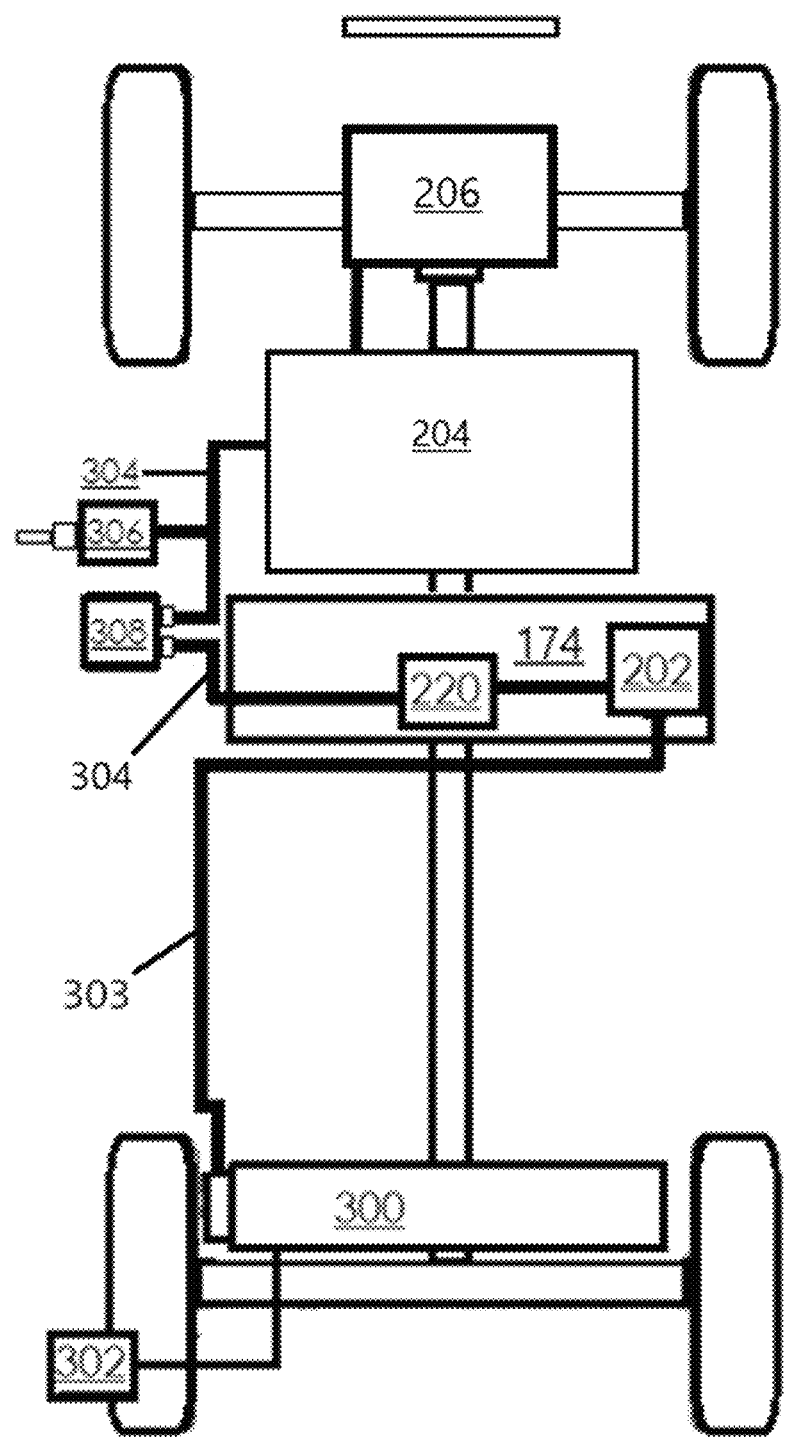
FIG. 2A is a plan schematic view of an electric vehicle with an installed truck-mount cleaning unit, according to embodiments of the invention.

BEVs use a large traction battery pack to power an electric motor and must be plugged in to electric vehicle supply equipment (EVSE). Because it runs on electricity, the vehicle does not contain the typical liquid fuel components, such as a fuel pump, fuel line, or fuel tank. General components of BEVs typically include: battery (all-electric auxiliary); charge port; DC/DC converter; electric traction motor; onboard charger; power electronics controller; thermal system (cooling); traction battery pack; and transmission (electric). FIG. 2A depicts a schematic representation of a BEV with an operational unit (a truck-mount cleaning unit 174) of an installed cleaning system 112, according to embodiments of the invention.

In embodiments, PHEVs use batteries to power an electric motor and another fuel, such as gasoline, to power an internal combustion engine (ICE). PHEV batteries can be charged using a wall outlet or charging equipment, by the ICE, or through regenerative braking. The vehicle typically runs on electric power until the battery is nearly depleted, and then the car automatically switches over to use the ICE. Plug-in hybrids may generally include series hybrid and parallel hybrid. In embodiments, series hybrids may comprise a BEV with an IC engine connected to a generator rather than the wheels, and parallel hybrids may comprise a BEV with an IC engine connected to a generator, the wheels and to the electric motor (via a common crankshaft or via belts).

Figure 2B:
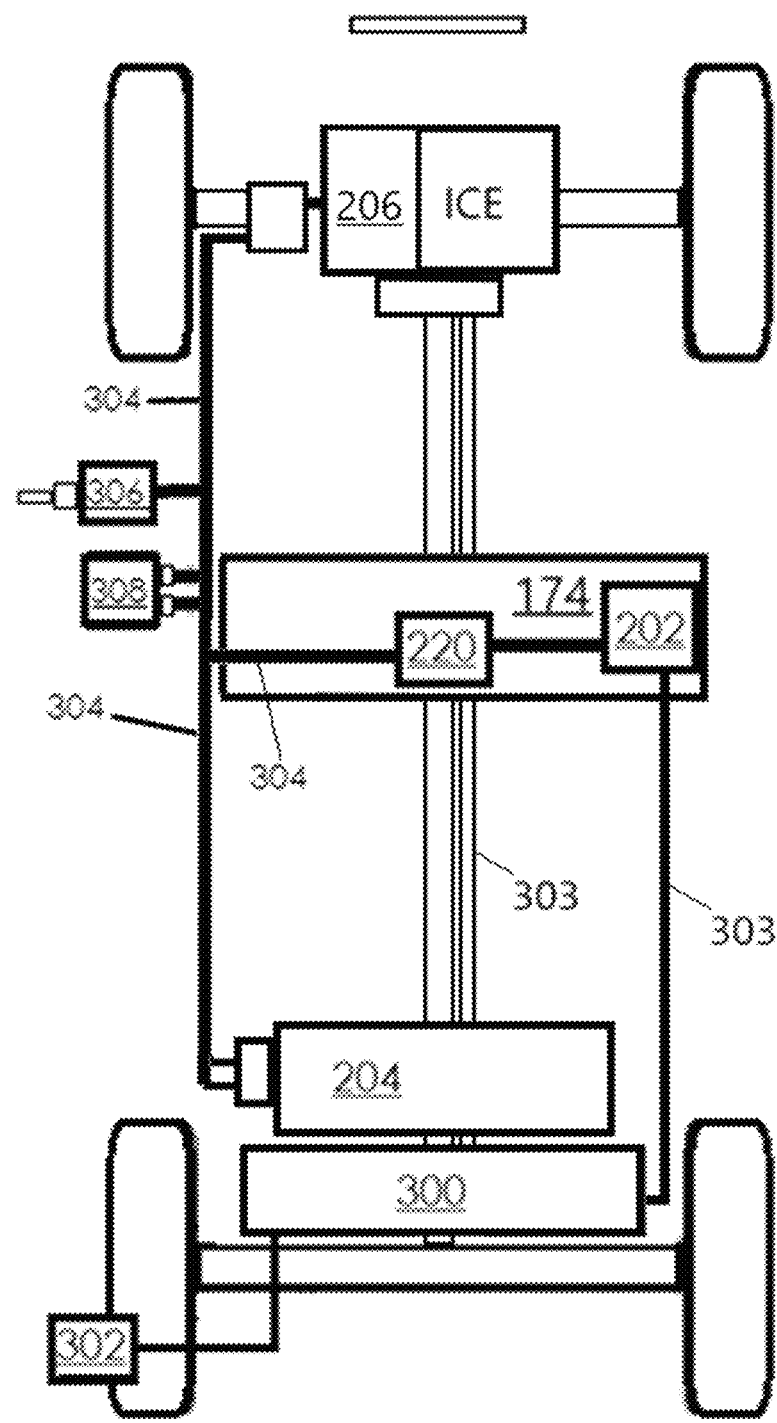
FIG. 2B is a plan schematic view of an electric vehicle with an installed truck-mount cleaning unit, according to embodiments of the invention.

General components of PHEVs typically include: battery (auxiliary); charge port; DC/DC converter; electric generator; electric traction motor; exhaust system; fuel filler; fuel tank (gasoline); internal combustion engine (spark-ignited); onboard charger; power electronics controller; thermal system (cooling); traction battery pack; and transmission. FIG. 2B depicts a schematic representation of a PHEV with an operational unit (a truck-mount cleaning unit 174) of an installed cleaning system 112, according to embodiments of the invention.

Figure 2C:
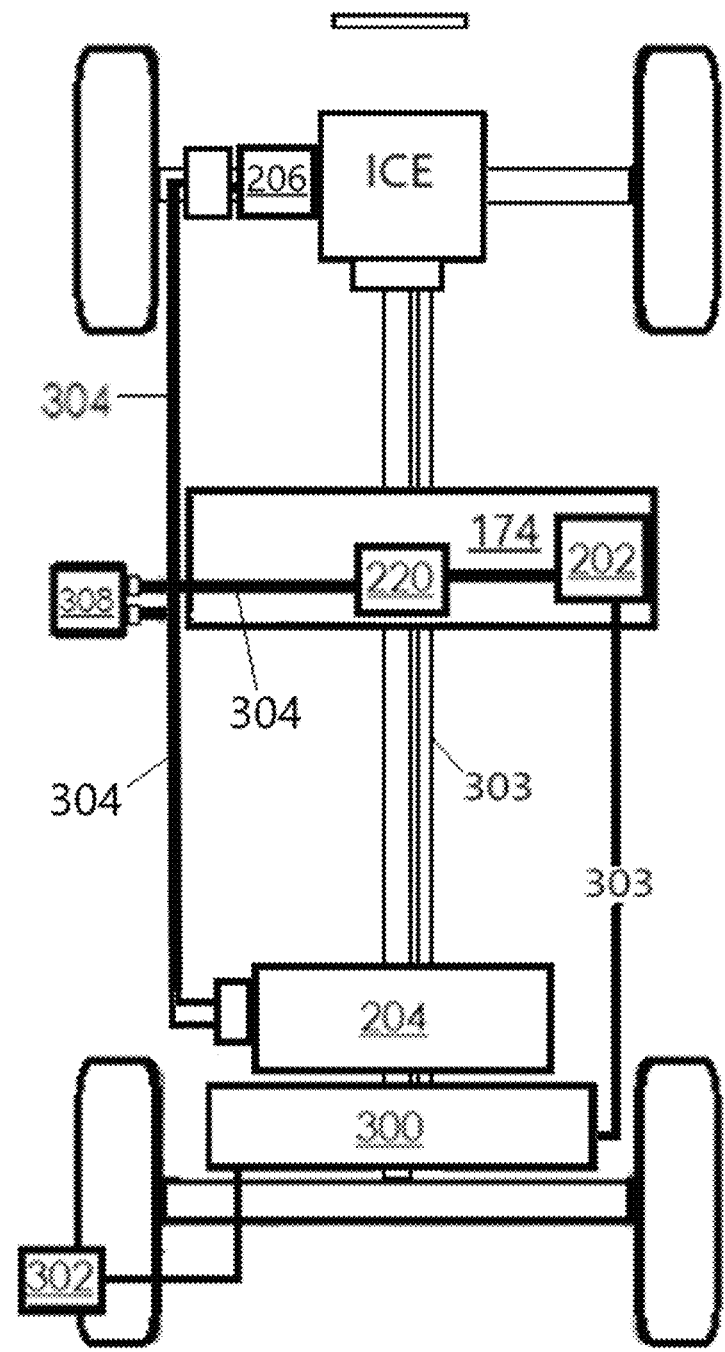
FIG. 2C is a plan schematic view of an electric vehicle with an installed truck-mount cleaning unit, according to embodiments of the invention.

In embodiments, HEVs are powered by an internal combustion engine and an electric motor, which uses energy stored in batteries. A hybrid electric vehicle typically cannot be plugged in to charge the battery. Instead, the battery is charged through regenerative braking and by the internal combustion engine. The battery can also power auxiliary loads and reduce engine idling when stopped. General components of HEVs typically include: battery (auxiliary); DC/DC converter; electric generator; electric traction motor; exhaust system; fuel filler; fuel tank (gasoline); internal combustion engine (spark-ignited); power electronics controller; thermal system (cooling); traction battery pack; and transmission. FIG. 2C depicts a schematic representation of a HEV with an operational unit (a truck-mount cleaning unit 174) of an installed cleaning system 112, according to embodiments of the invention.

In one or more embodiments, the electric vehicle includes an electrified powertrain that comprises a plurality of components that may include: a battery pack/unit, wherein the battery pack/unit may be made up of multiple lithium ion cells and stores energy that may be used to run the vehicle, and typically provide direct current (DC) output; an electric motor (front/back) that converts electrical energy to mechanical energy that is delivered to the wheels via a transmission; a DC-AC converter that is configured to convert DC from the battery pack to AC for powering the electric motor and to help distribute power to different systems by converting the output power from battery pack to the expected level, wherein converted power is delivered to respective smaller ECUs via wiring harness; and a motor control mechanism (which also may be referred to as a Powertrain Electronic Control Unit (ECU)) that is configured to manage electrical power transfer and control frequency and magnitude of voltage supplied to the electric motor for control of speed and acceleration.

In embodiments, the plurality of components of the electrified powertrain may further include an on-board charger that converts AC received through a charge port 306, 308, to DC and may control the amount of current flowing into the battery pack.

In embodiments, there may be multiple hardware and software components included in the electrified powertrain. Such components may include ECUs that are basically software programs integrated with the powertrain components to help data exchange and processing, e.g., the powertrain ECU mentioned above. There may be several small ECUs that perform specific functions. Examples of ECUs include: a Battery Management System (BMS) that continuously monitors the state of the battery unit and takes measures in case of a malfunction, performs cell balancing to deliver maximum efficiency from the battery pack, communicates with other ECUs and sensors, as well as EVSEs to control the charging input, monitors the current state of charge and shares data about battery specifications; a Thermal Management System that maintains operating temperature ranges for powertrain components; and Body Control Module (BCM) supervises and controls the functions of electronic accessories, such as power windows, mirrors, security and vehicle access control.

Figure 3A:
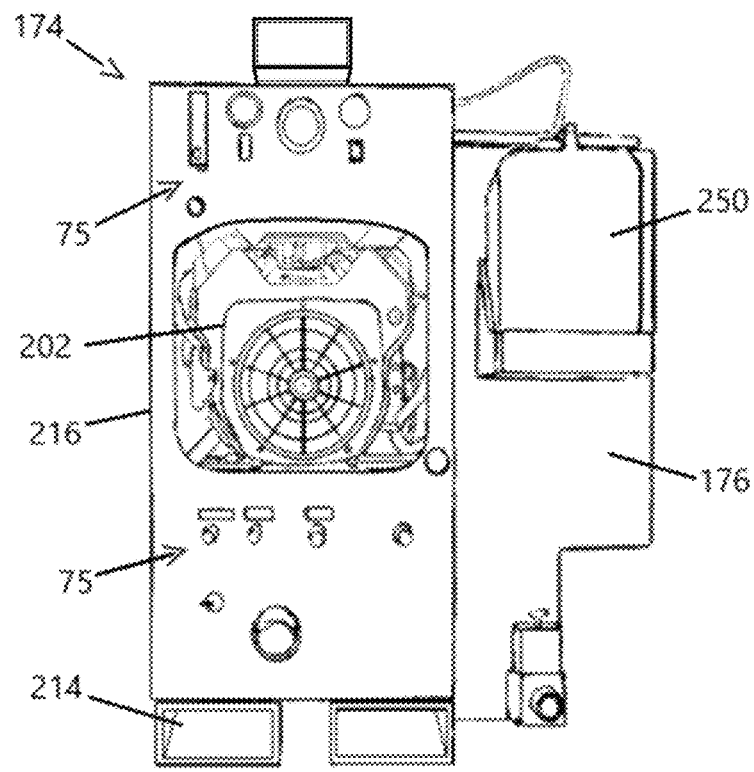
FIG. 3A is a front view of a truck-mount cleaning unit according to embodiments of the invention.
Figure 3B:
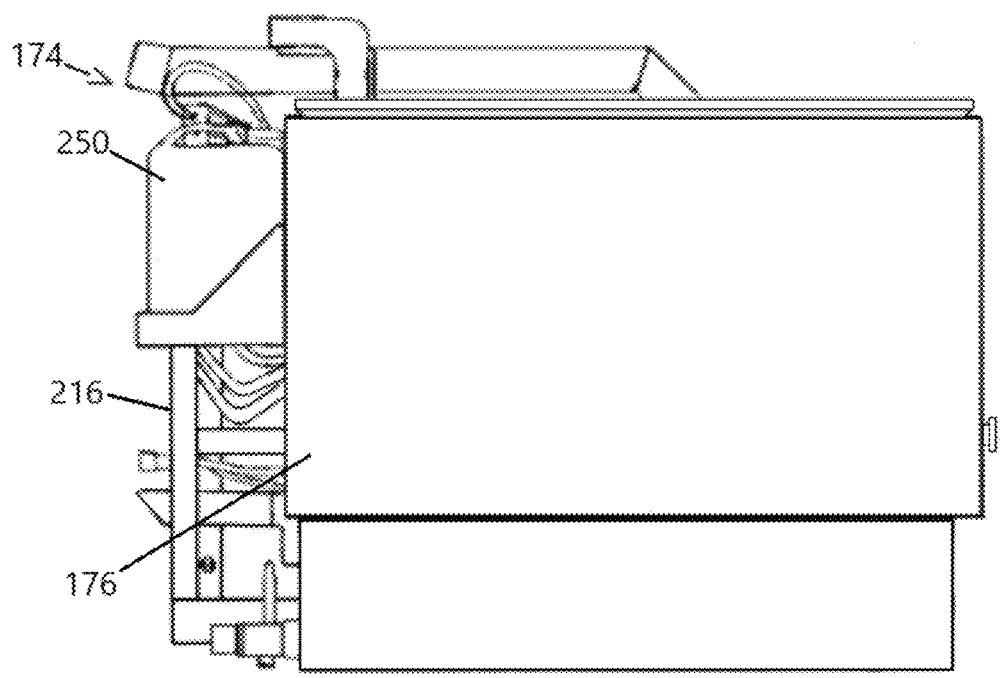
FIG. 3B is a right side view of the truck-mount cleaning unit of FIG. 3A.
Figure 3C:
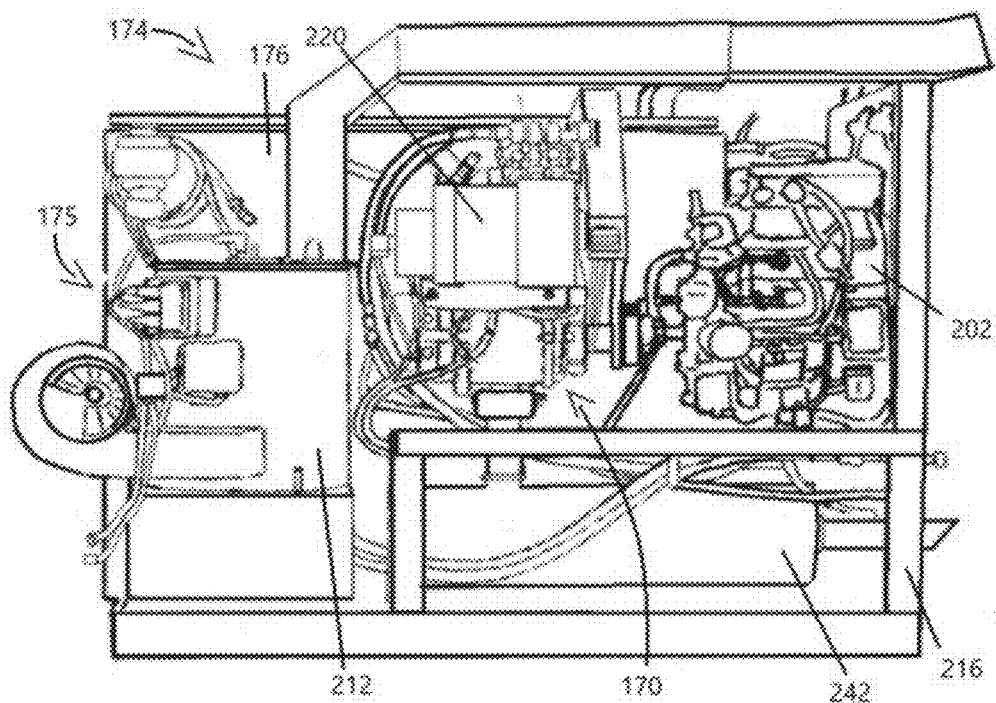
FIG. 3C is a left side view of the truck-mount cleaning unit of FIG. 3A.

Referring to FIGS. 3A-3C, in embodiments, the vehicle mounted cleaning system 112 includes a truck-mount cleaning unit 174. In one or more embodiments, the truck-mount cleaning unit 174 comprises a heat exchange truck-mount unit 175 and a vacuum recovery tank unit 176, which may be a 75-gallon stainless steel waste tank; an engine unit 202; a generator unit 220, a blower pump unit 170 having a blower and a high-pressure pump, which may include a clutch; a heater 212, which may be 195,000 BTU Kerosene or 125,000 BTU Propane; a heater exhaust 213; and an operator control panel 75.

In one or more embodiments, the cleaning unit 174 includes an electrical power source for charging the rechargeable battery unit 204 of the vehicle. In an embodiment, the electrical power source is a generator device 220, which may be electrically connected to the rechargeable battery unit 204. The generator device 220 is functionally connected to the engine 202 for driving the generator device 220. Generator 220 supplies power to run the heater 212, its components and auxiliary electrical devices and may be electrically connected to the rechargeable battery unit 204 for recharging for supplying power to the electric motor 206.

Figure 3D:
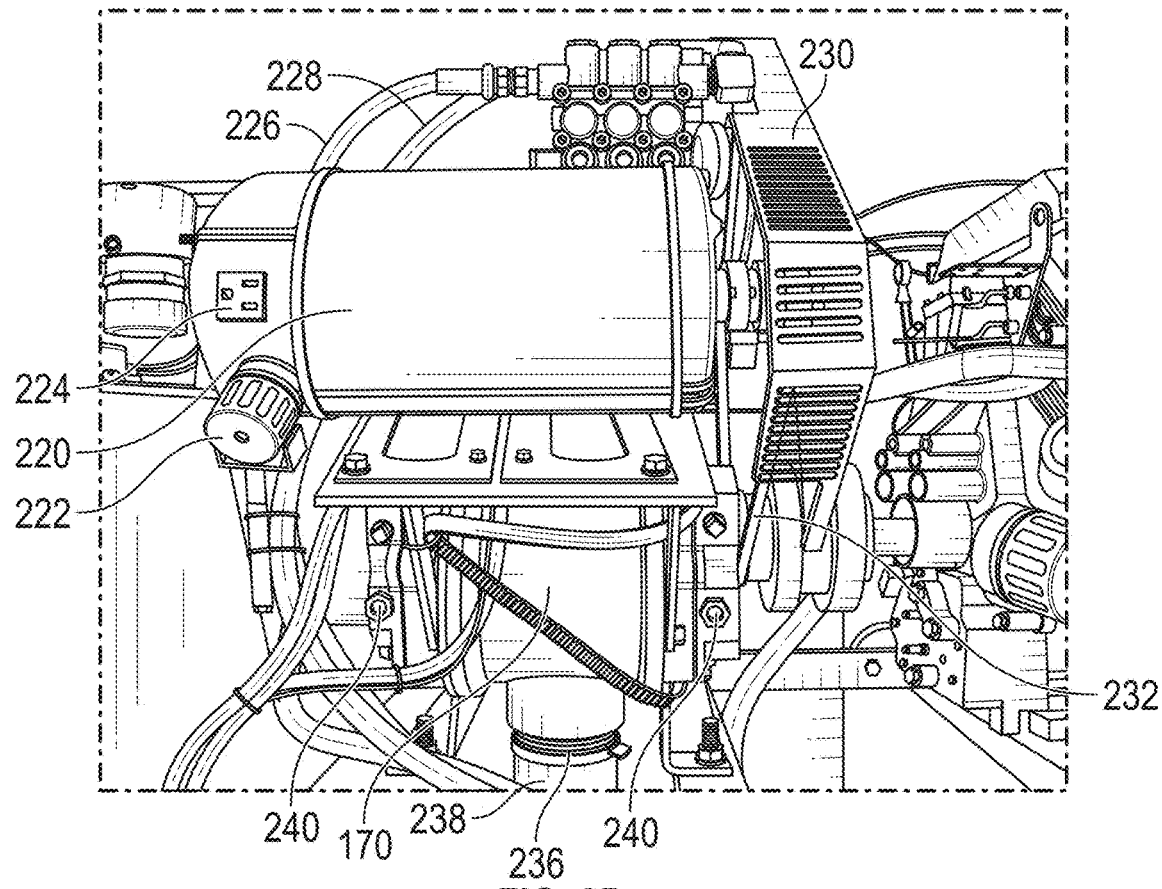
FIG. 3D is a partial left side view of the truck-mount cleaning unit of FIG. 3A.

FIG. 3D depicts a view of the generator device 220 and blower unit 170 of the cleaning unit 174. In one or more embodiments, the cleaning unit 174 includes the generator device 220, an electrical cord end 222, a generator receptacle or outlet(s) 224, voltage regulator to prevent overcharging, a pulse hose 226, a pressure hose-pump to unloader 228, a pulley/belt guard 230, a belt 232, the blower 170, a close nipple 236, a blower exhaust hose 238 and a blower oil sight gauge 240. In embodiments, the blower exhaust hose 238 may be connected to a blower silencer 242 with an exhaust pipe.

In one or more embodiments, the generator 220 is sized and configured to recharge the EV battery unit 204 at an average rate of 50 Kw per hour or more while the engine unit 202 is operating. In one or more embodiments, the generator 220 is sized and configured to fully recharge a battery unit for an electric light-duty cargo van having a rechargeable battery that typically runs a 2.5 Kw/Mile average and, in one or more embodiments, in a charge time of about 1-2 hours. In one or more embodiments, the generator 220 is a 120-volt generator. In an embodiment, the generator 220 is an inverter generator with stable energy and clean pure sine wave.

In one or embodiments, the electric vehicle (EV) 10 with the cleaning system 112 installed includes connectors, cables and electricals providing for electrical communication between the battery unit 204 and the cleaning system generator 112, allowing for charging of the battery unit 204. In one or more embodiments, the generator 220 is equipped with a bulkhead connector for a fast and easy connection. In embodiments, a harness may be connected into a charging port 308. In an embodiment, the charging port 308 may be located on the inside of the vehicle to allow charging of the battery unit 204 while the system 112 is running. In embodiments, a standard charging plug/port 306 may be located on the outside of the vehicle so if needed it could be plugged into a rapid charging station. The standard charging plug/port 306 remains available on the outside of the EV 10 for connecting with a rapid charging station or other external power supply. In embodiments, the system may be configured to connect the generator 220 to the standard charging plug/port.

In embodiments, the engine 202, which may be petrol or diesel fueled, powers the high-pressure pump and vacuum blower by direct drive. The engine 202 may have a starter motor fitted alone with a pull starter and an alternator that charges the battery and supplies 12-volt DC current to all the electrical components. An electrical fuel pump may be connected to a fuel tank or the machine and supplies the carburetor or injectors on the engine with a fuel tank, which may be fitted to the chassis of the van to supply the fuel pump.

In embodiments, the engine drives the blower 170 with direct plumbing from the waste tank to the blower and out of the blower to a silencer system 242 providing maximum airflow and vacuum. The pump of the blower pump unit pumps cleaning fluid 250 to the cleaning site. The blower 170 providing the suction for the cleaning fluid recovery. In operation, the vacuum blower lifts dirty water from the location or targeted object being cleaned, such as a carpet. The high-pressure water pump pumps heated water and chemical onto the targeted object. The heat exchanger or water heater 175 fitted to the cleaning unit 174 to heat the water up through an exhaust manifold system. Rather than a heat exchanger, a thermostat-controlled boiler may be used. The chemical injection unit injects carpet cleaning chemical into the solution line and water and the chemical are pumped through a solution hose to the object/carpet. A suction hose powered by the vacuum blower picks up the dirty water and transfers it to the recovery waste tank 176.

In one or more embodiments, the engine 202 is a gasoline engine and may be modified to use fuel from the vehicle's gasoline fuel tank 300 via a fuel line 303. The cleaning unit 174 may be modified with a fuel tank hook-up kit to allow the engine to use fuel from the vehicle's gasoline fuel tank. In one or more embodiments, the cleaning unit 174 is connected to a separate dedicated fuel tank or an alternative fuel source.

In embodiments, the cleaning unit 174 may further include an operator control panel 75 having an upper panel and a lower panel; forklift pockets 214 for installation and removal; a frame 216, which may be stainless-steel; a manifold, which may be stainless steel; and a chemical injection system, including a chemical agent reservoir 250, for direct chemical injection. The cleaning system 112 may further include a freshwater tank 186, one or more wands; a vacuum Hose; and a high-pressure hose.

In an embodiment, the cleaning unit 174 may have the following dimensions: 36"w×39⅜"h×45¼"l (42½" to top of vac connections); Heater: 14"w×36¼"h×14"l (22" w/fittings); Heater Frame: 17⅛"×17⅛"; Weight: Console: 400 lbs., Waste Tank: 100 lbs., Heater: 75 lbs.

Further details of parts, features, workings and working requirements, specifications, operating and maintenance procedures and instructions, electrical components and wiring, fluid flow paths and accessories of embodiments of the cleaning unit 174 and the cleaning system 112 are described in the El Diablo Master Blend Operator's Manual. The cleaning unit 174 portrayed generally reflects units available from El Diablo Truck Mounts LLC, Rapid City, South Dakota.

In embodiments, the connector(s) or plug(s) are configured and of the appropriate type to fit in the charge port(s)/socket(s) and transfer sufficient electrical power from the generator 220 to the battery unit 204, at least considering the parameters of rated power (in kW) and current type (DC/AC); connector type; and mode required according to embodiments of the invention.

In one or more embodiments, the connector(s) are the same as, or similar to, charging connectors compatible for one or more of the following: 3 phase, 60A per phase (Supply type/charger rating), Rapid charge, AC (AC/DC), and 43 KW (rated power); 3 phase, DC (Supply type/charger rating), Rapid charge, DC (AC/DC), and 50 KW (rated power); 3 phase, DC (Supply type/charger rating), Rapid charge, DC (AC/DC), and 120 KW (rated power); and 3 phase, 32A per phase (Supply type/charger rating), Fast charge, AC (AC/DC), and 22 kW (rated power). In an embodiment, the connector(s) are the same as, or similar to, charging connectors compatible for a 50 kW DC CHAdeMO inlet.

In an embodiment, the battery unit is connected to the generator or second chargepoint via a cable which is fitted with connectors, one of which at a first end fits into the first and/or second charge port (inlet socket), and the second of which at a second fits into a charger outlet socket connected to the generator. In embodiments, the second end may be affixed or to 'tethered' to generator.

In one or more embodiments, the charging connector(s), charging port(s), battery unit 204, generator 220 and charging cable(s) are compatible with a rated power of about 50 kW or higher. In one or more embodiments, the charging connector(s), charging port(s), battery unit 204, generator 220 and charging cable(s) are compatible with rapid charging at one or more of 43 kW or higher, 50 kW or higher and 120 kW or higher. In one or more embodiments, the charging connector(s), charging port(s), battery unit 204, generator 220 and charging cable(s) are compatible with rapid charging at one or more of DC 50 KW or higher, DC 120 kW or higher and AC 43 kW or higher.

In one or more embodiments, the charging connector(s), charging port(s), battery unit 204, generator 220 and charging cable(s) are compatible with DC Fast Charging. In one or more embodiments, the EV vehicle and is configured for Inductive Charging and includes Inductive charging equipment for cordless transfer of electricity to the battery unit.

Figure 4:
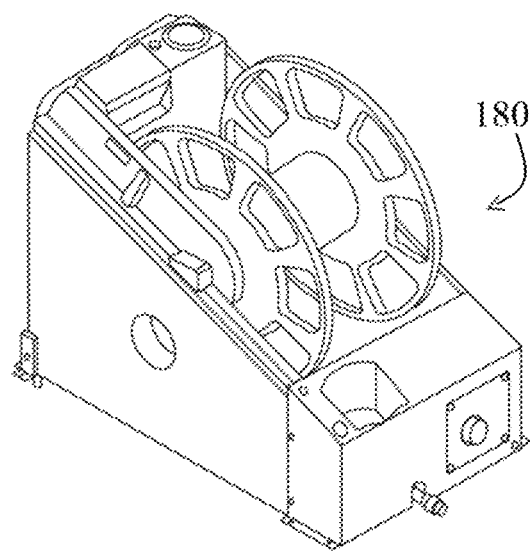
FIG. 4 is a prior art perspective view of a hose reel and tank operational unit.
Figure 5A:
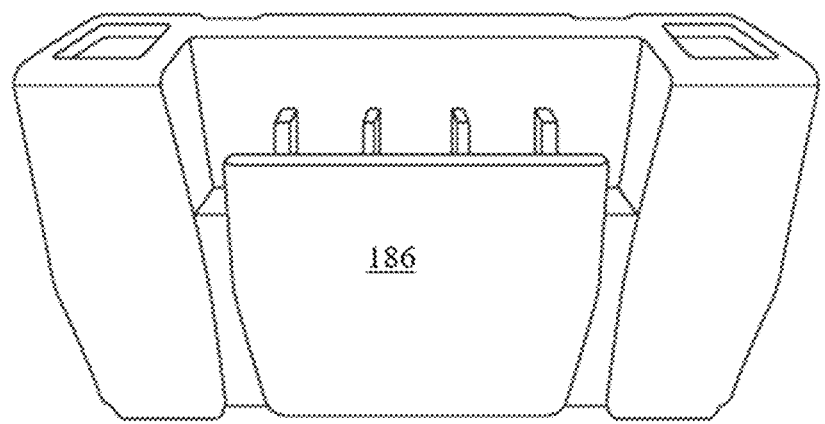
FIG. 5A is a prior art perspective view of an auxiliary liquid tank.
Figure 5B:
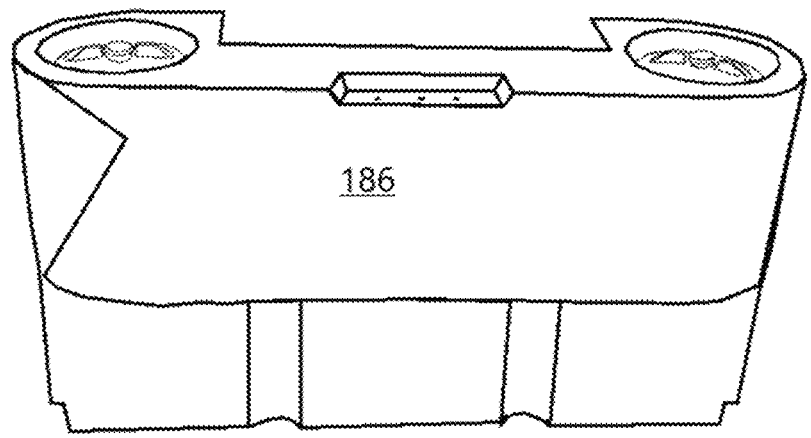
FIG. 5B is a prior art perspective view of an auxiliary liquid tank.

In one or more embodiments, the cleaning system 112 includes a hose reel and liquid storage tank unit 180, an example of which is depicted in FIG. 4. In embodiments, unit 180 may be positioned directly rearward of the cleaning unit 174 and individually secured to the vehicle. In one or more embodiments, the hose reel and liquid storage tank unit 180 is mounted and attached to a frame assembly 200 in the vehicle. The unit 180 may have a manual or powered reel for a vacuum hose and a reel for a fluid dispensing. In one or more embodiments, the cleaning system 112 includes an auxiliary liquid tank unit 186, examples of which are depicted in FIGS. 5A and 5B. In embodiments, unit 186 may be positioned in the rearward cargo area of the van.

Operational units that may be combined to form a complete vehicle mounted carpet cleaning system are available from various manufacturers. Individual operational units may combine a plurality of the functionalities associated with carpet cleaning. Such integrated operational units will typically have a chassis supporting components and include steel apertured mounting strips or tabs for bolting the particular unit to floors of vehicles.

Such operational units for truck or van mountable cleaning systems are available from various manufacturers. The operational units portrayed, generally reflect units available from Hydramaster Corporation, Mukilteo, Wash and El Diablo Truck Mounts LLC, Rapid City, South Dakota. Other manufacturers' operational units will have particular functionalities differently arranged.

Figure 6A:
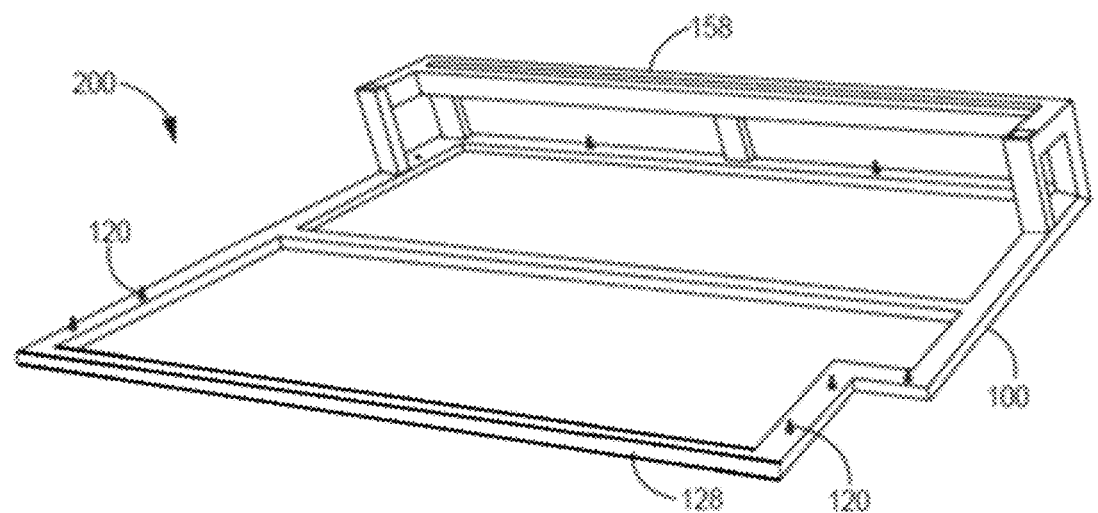
FIG. 6A is a perspective view of a mounting frame assembly in accordance with embodiments of the invention.

In one or more embodiments, the operational units are mounted in the vehicle 10 on a mounting frame assembly, which is configured and arranged to be secured to the truck or van floor and to receive the operational units of carpet cleaning systems. Referring to FIG. 6A, a mounting frame assembly 200 is illustrated and includes a main mounting frame 100 and an elevating tank mounting frame 158 mounted on the rearward end portion of the main frame 100.

Figure 6B:
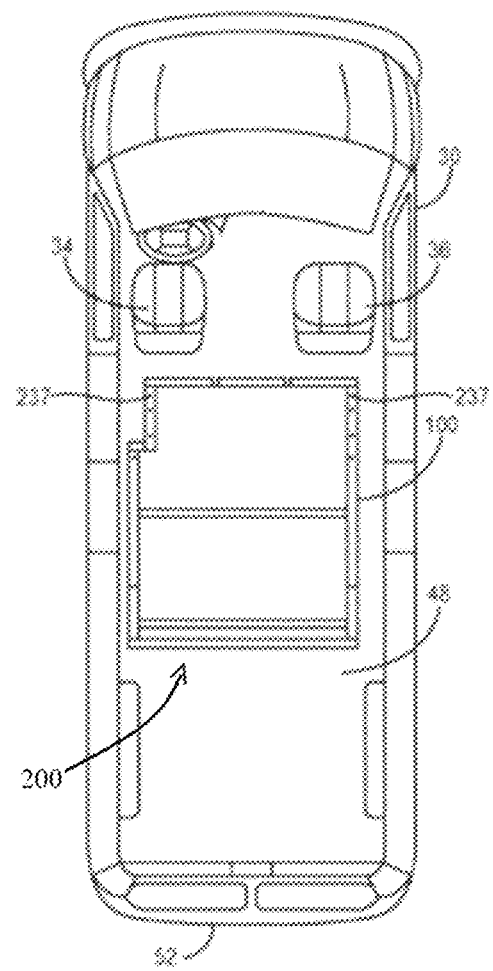
FIG. 6B is a top plan view of the mounting frame assembly of FIG. 6A installed in an electric vehicle, according to embodiments of the invention.

Threaded studs 120 may be positioned to be aligned with securement portions of the operational units, which, in one or more embodiments, may be apertures and/or mounting strips, such as flanges. FIG. 6B depicts the mounting frame assembly 200 mounted in the vehicle on the cargo box floor before the operational units are installed thereon; and FIGS. 1A-1B illustrate the operational units secured to the mounting frame assembly 200, with appropriate wiring and connections. Mounting frame assemblies are further described in US Patent Publication 20200262330, which is incorporated herein by reference, in its entirety.

Figure 7:
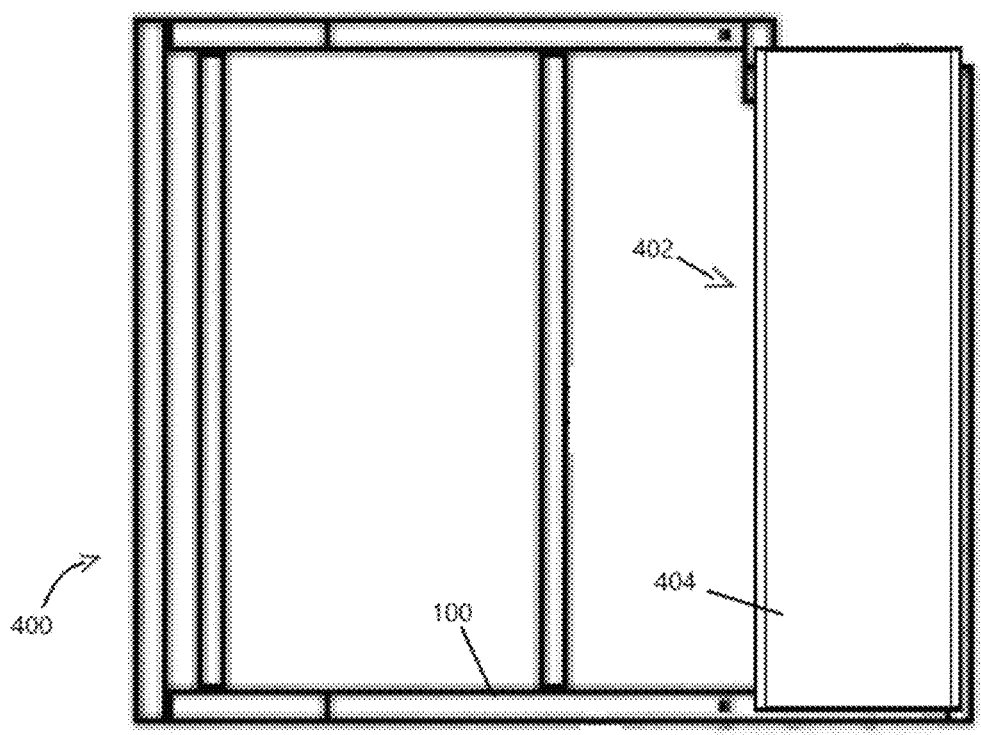
FIG. 7 is a top plan view of a mounting frame assembly, according to embodiments of the invention.
Figure 8:
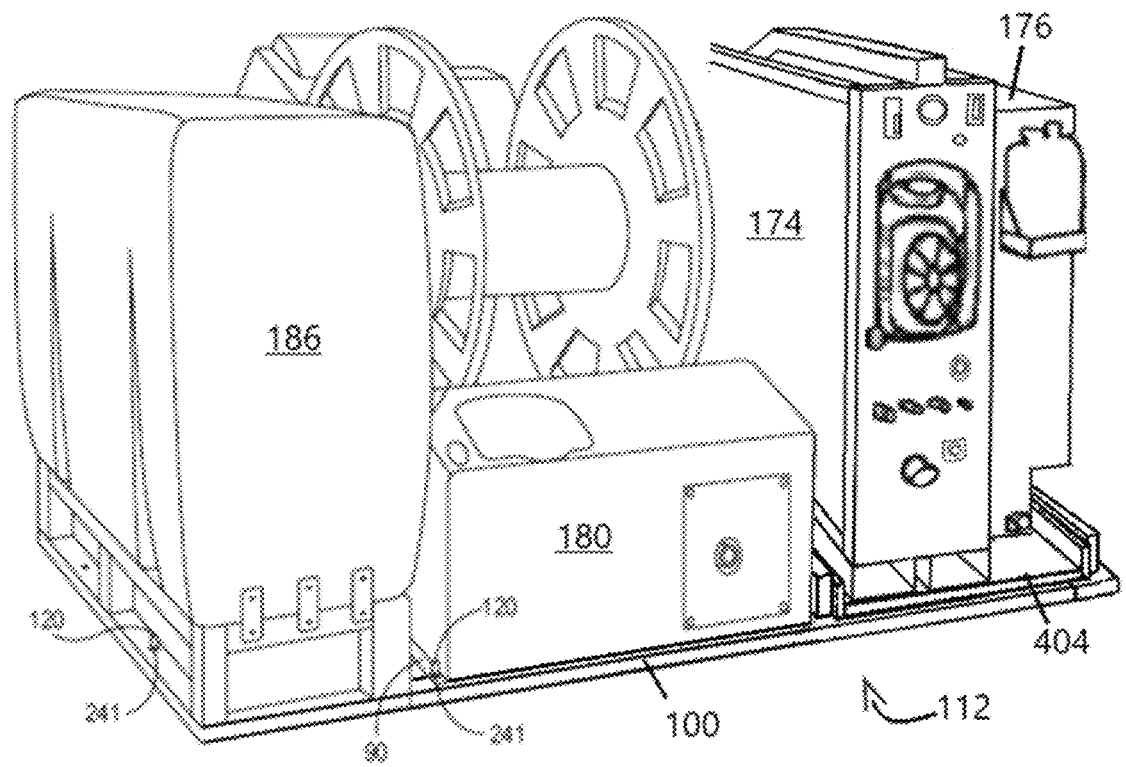
FIG. 8 is a perspective view of vehicle mounted cleaning system operational units mounted on the mounting frame assembly of FIG. 7, according to embodiments of the invention.

Referring to FIGS. 7-8, in one or more embodiments, mounting frame assembly 400 includes a slide-out assembly 402 positioned at the forward end portion 305 of the main frame 100 for easy accessibility and maintenance of the cleaning unit 174 (truck-mount). In one or more embodiments, the slide-out assembly 402 includes a sliding tray 404 and one or more sliding/rolling components 406 engaged to the sliding tray allowing a mounted operation unit of the cleaning system 112 to slide out of the side 150 of the vehicle for access and maintenance. In embodiments, the sliding/rolling component 406 may comprise one or more heavy duty slides engaged with the tray 404 and with a portion of the main frame 100 and/or a separately installed mounting frame. Examples of slides and mounted slide configurations include heavy duty extension ball bearing drawer slides and constructed extension drawer slide configurations obtainable from Fulterer USA Inc., located in High Point, North Carolina.

In embodiments, frame assembly 400 may sit on and be secured to the vehicle floor and configured in a similar manner as frame assembly 200. In an embodiment, the slide-out assembly 402, or a portion thereof, may be mounted and secured to a separately installed mounting frame and/or a forward portion of the main frame 100 modified to receive and slidably secure the slide-out assembly 402. In embodiments, the sliding/rolling component(s) 406 may be side mounted and/or flat mounted. In embodiments, frame assembly 200/400 may comprise a plurality of extending stainless steel frame portions and fittings and connections. In embodiments such fitting and connections may be quick connect style fittings and connections. FIG. 8 depicts the operational units positioned on the mounting frame assembly 400 and FIGS. 1A-1B illustrate the operational units secured to the mounting frame assembly 400, with appropriate wiring and connections.

Features and benefits of embodiments include that the modified frame assembly allows for the fast installation and removal of the cleaning unit; provides additional structural support to the vehicle; and allows for greater accessibility to the cleaning unit, including to all components, fittings, hoses, wiring, engine, oil filter, air filter, and spark plugs, for easier service, maintenance, and inspection. Such features are not available with conventional installations, which would require removal of components.

In one or more embodiments, the frame assembly 400, positioned and configured in the vehicle such that the operational units may be removed through either the cargo van side door 150 or rear access door 152 and be readily accessed and serviced.

Full charge capacity for the rechargeable battery of the electric cargo van typically translates to a 200-mile range. In an example, an electric cargo van having an installed gas-powered carpet cleaning system, in accordance with one or more embodiments, travels 20 miles from a base location to a first job location. After arriving at the first job, (1) the cargo van would have approximately 180 miles left on its battery charge. Prior to performing the first job, the generator of the installed gas-powered carpet cleaning system is electrically connected to the electric cargo van's rechargeable battery. The operator proceeds to start the gas-powered carpet cleaning system inside the back of the cargo van and perform the first job. The gas-powered carpet cleaning system uses fuel from the cargo van's fuel tank or a separate installed tank. During the performance of the first job, the generator attached to the system recharges the electric cargo van's rechargeable battery. In an embodiment, the rechargeable battery is recharged at about 50 Kw per hour or more. Upon conclusion of the first job, the cargo van is recharged to a full charge, with a 200-mile range. The operator proceeds to further jobs, recharging the electric cargo van's rechargeable battery at each job, and returns to the base location for a total travel distance of 80 miles. For the full 80-mile route, the gas-powered carpet cleaning system used approximately 4 gallons of gasoline, meaning that the vehicle effectively ran for 80 miles on the equivalent of 4 gallons of fuel. Standard cargo vans with installed conventional direct drive carpet cleaning systems operate an 80-mile route, cleaning for an average of 1 hour per location, at about 4.5 MPG. Additionally, the conventional direct drive carpet cleaning systems require the engines of the standard cargo vans to be run at high RPMs to power the cleaning systems during operation causing an additional fuel consumption of 2.5 gallons per hour. This translates to about 17.7 gallons of fuel for drive time and an additional 10 gallons of fuel for cleaning time, totaling about 27.7 gallons for the typical 80-mile route.

In one or more embodiments, the electric vehicle (EV) 10 and vehicle mounted cleaning system 112 may be adapted for use in water restoration and flood mitigation applications.

In one or more embodiments, an electric vehicle and vehicle mounted system, as described herein, may be adapted for use in emergency relief systems and organizations i.e., road crews, electrical companies, FEMA contractors. As an example, an electric vehicle and vehicle mounted system for roadside assistance applications may include a small generator to operate pumps and other equipment typically used.

In one or more embodiments, an electric vehicle and vehicle mounted system, as described herein, may be adapted for use by mobile welding companies and mobile welding systems.

In one or more embodiments, the self-charging generator system, as described herein, may be adapted to operate off an RV setup allowing an electric vehicle to be towed by the RV and recharged using the existing auxiliary generator on the RV.

In one or more embodiments, the vehicle powertrain provides power to the vehicle and includes components that generate power to move the vehicle and deliver it to the wheels.

In one or more embodiments, the vehicle includes a series hybrid powertrain, wherein the IC engine runs on hydrogen.

The attached Appendices include drawings, images and subject matter depicting and describing further and various aspects of embodiments of the disclosure. The Appendices and the subject matter therein should be considered part of this disclosure. Attached hereto are Appendices A1 and A2, which are considered to be part of the application. The inventor reserves the right to claim any part, portion, component, element, aspect, feature, themes, patterns, color(s), image and text and number indicia positioning and arrangement or combination thereof of the text, drawings, images and figures shown or described in Appendices A1-A2.

The following United States patents and patent publications are hereby incorporated by reference herein in their entireties except for patent claims and express definitions contained therein: U.S. Pat. Nos. 7,208,050; 6,675,437; 6,625,844; 6,305,739; 6,039,421; 6,007,248; 5,469,598; 5,430,910; 5,095,578; 5,026,176; 4,950,123; 4,949,424; 4,940,082; 4,798,149; 4,336,627; 4,284,127; 4,207,649; 3,774,261; 2,643,162; 2,444,432; 1,611,326; EP0314176; U.S. Pat. Nos. 10,377,251; 10,164,502; 10,093,167; 9,987,938; 9,827,865; 9,718,373; 9,580,062; 9,352,644; 9,321,364; 8,618,752; 8,314,587; 8,183,820; 8,112,194; 8,106,627; 8,030,884; 7,889,524; 7,740,092; 3,566,717; 11,142,183; 11,084,327; 10,963,147; 10,940,850; 10,369,984; 10,306,324; 10,039,988; 10,025,478; 9,862,375; 9,782,680; 9,762,967; 9,602,464; 9,381,427; 9,331,341; 9,045,135; 9,024,050; 8,630,776; 8,443,098; 8,374,771; 8,290,681; 7,816,303; 7,703,751; 7,183,017; 7,008,971; 6,962,959; 6,244,228; US20030229963; US20040118439; US20040134649; US20050278889; US20060032725; US20060145502; US20060250902; US20070012492; US20080035304; US20080136371; US20080150365; US20080257620; US20080277174; US20080300743; US20090030712; US20090040029; US20090044532; US20090048745; US20090120321; US20090250276; US20100024242; US20100038156; US20100038160; US20100066167; US20100133219; US20100140001; US20100231169; US20100294459; US20110011656; US20110011659; US20110017532; US20110114398; US20110285206; US20120319471; US20130181679; US20130223110; US20140231165; US20140248993; US20140334186; US20150108831; US20150207344; US20150255985; US20150291037; US20160065003; US20160229408; US20170366112; US20180065491; US20180086330; US20180334042; US20190106005; US20190176641; US20200039356; US20200262330; US20220161706; US20210229665; US20210188244; US20200354844; US20200164858; US20190389376; US20160195405; US20120132032; US20110004364; US20080116430; US20060105215; US20050282053; US20050266980; US20040210464; US20030108790. Components illustrated in the incorporated by reference references may be utilized with embodiments herein. Incorporation by reference is discussed, for example, in MPEP section 2163.07 (B).

All of the features disclosed, claimed, and incorporated by reference herein, and all of the steps of any method or process so disclosed, may be combined in any combination, except combinations where at least some of such features and/or steps are mutually exclusive. Each feature disclosed in this specification may be replaced by alternative features serving the same, equivalent or similar purpose, unless expressly stated otherwise. Thus, unless expressly stated otherwise, each feature disclosed is an example only of a generic series of equivalent or similar features. Inventive aspects of this disclosure are not restricted to the details of the foregoing embodiments, but rather extend to any novel embodiment, or any novel combination of embodiments, of the features presented in this disclosure, and to any novel embodiment, or any novel combination of embodiments, of the steps of any method or process so disclosed.

Although specific examples have been illustrated and described herein, it will be appreciated by those of ordinary skill in the art that any arrangement calculated to achieve the same purpose could be substituted for the specific examples disclosed. This application is intended to cover adaptations or variations of the present subject matter. Therefore, it is intended that the invention be defined by the attached claims and their legal equivalents, as well as the illustrative aspects. The above-described embodiments are merely descriptive of its principles and are not to be considered limiting. Further modifications of the invention herein disclosed will occur to those skilled in the respective arts and all such modifications are deemed to be within the scope of the inventive aspects.

What is claimed is:

1. An electric cargo van with an installed cleaning system, the electric cargo van having a cargo box with a cargo floor and an electrified powertrain comprising:
    a traction battery pack;
    an electric traction motor connected to the traction battery pack, wherein the traction battery pack stores electricity for use by the electric traction motor and electric traction motor driving wheels of the electric cargo van;
    a transmission connected to the electric traction motor, wherein the transmission transfers mechanical power from the electric traction motor to drive the electric traction motor driving wheels;
    a first charge port electrically connected to the traction battery pack, the first charge port allowing the electric cargo van to connect to an external power supply to charge the traction battery pack;
    the installed cleaning system comprising a vacuum cleaning unit, the vacuum cleaning unit comprising:
    a motor;
    a generator connected to and driven by the motor and comprising an electrical cord end and a generator receptacle, wherein the motor drives the generator producing electricity; and
    a charging cable connected to the generator at a first end and a connector at a second end, the charging cable configured to electrically connect the generator to the traction battery pack, wherein, during operation of the vacuum cleaning unit and when the generator is electrically connected to the traction battery pack, electricity is transmitted from the generator to the traction battery pack, thereby recharging the traction battery pack.

2. The electric cargo van of claim 1, the electrified powertrain comprising a second charge port electrically connected to the traction battery pack, the second charge port allowing for connection to a power supply charging of the traction battery pack.

3. The electric cargo van of claim 1, the installed cleaning system comprising a plurality of discrete operational units mounted in the cargo box, the plurality of discrete operational units including the vacuum cleaning unit, a hose reel and tank unit and a water tank mounted and secured rearward of the hose reel and tank unit.

4. The electric cargo van of claim 1, wherein the vacuum cleaning unit provides cleaning functions including: pumping and dispensing of cleaning fluid away from the electric cargo van, vacuum recovery of used cleaning fluid collected away from the electric cargo van, storage of cleaning fluid before dispensing, and storage of recovered cleaning fluid after recovery, the vacuum cleaning unit further comprising:
    a blower unit connected to a blower exhaust;
    a heater connected to a heater exhaust and an electrical box; and
    a pump.

5. The electric cargo van of claim 3, wherein the plurality of discrete operational units is mounted to the cargo floor on a frame assembly.

6. The electric cargo van of claim 5, the frame assembly comprising a drawer slide extendable from an inserted condition to an extended condition, wherein the vacuum cleaning unit is mounted on the drawer slide.

7. The electric cargo van of claim 6, the drawer slide being a heavy-duty extension ball bearing drawer slide.

8. The electric cargo van of claim 1, wherein the electric cargo van is a converted petroleum vehicle incorporating an electrification platform.

9. The electric cargo van of claim 1, wherein the generator is sized and configured to recharge the traction battery pack in a charging time of less than two hours while the vacuum cleaning unit is operating.

10. The electric cargo van of claim 1, wherein the generator has a rated power of 43 kW or more.

11. The electric cargo van of claim 1, the electric cargo van including a fuel tank, wherein fuel from the fuel tank is utilized for the operation of an engine of the vacuum cleaning unit.

12. A method of recharging a battery pack of an electric vehicle with a truck-mount cleaning system installed therein, comprising:
   providing a vehicle at a job site, the vehicle having and electrified powertrain and an installed truck-mount cleaning system, the electrified powertrain comprising:
   a traction battery pack;
   an electric traction motor connected to the battery pack, wherein the battery pack stores electricity for use by the electric traction motor and electric traction motor driving wheels of the electric vehicle;
   an electric transmission connected to the electric traction motor, wherein the electric transmission transfers mechanical power from the electric traction motor to drive the electric traction motor driving wheels;
   a first charge port electrically connected to the battery pack, the first charge port allowing the vehicle to connect to an external power supply in order to charge the traction battery pack;
   a second charge port electrically connected to the battery pack, the second charge port allowing for connection to a power supply charging of the traction battery pack;
   the truck-mount cleaning system comprising a vacuum cleaning unit comprising:
   a motor;
   a generator connected to and driven by the motor and comprising an electrical cord end and a generator receptacle, wherein the motor drives the generator producing electricity; and
   a charging cable connected to the generator at a first end and a first connector at a second end, the first connector configured to connect to the second charge port,
   connecting the first connector to the second charge port allowing electrical communication between the generator and the battery pack;
   engaging an engine, thereby driving the generator and producing energy; and
   operating the truck-mount cleaning system and performing a cleaning operation at the job site, wherein, during operation of the truck-mount cleaning system, the electricity is transmitted from the generator to the battery pack, thereby recharging the battery pack.

13. The method of claim 12, the truck-mount cleaning system further comprising a water tank mounted and secured rearward of a hose reel and tank unit.

14. The method of claim 12, wherein the electric vehicle is a converted petroleum vehicle incorporating an electrification platform.

15. The method of claim 12, wherein the generator is sized and configured to recharge the battery pack in a charging time of less than two hours while the vacuum cleaning unit is operating.

16. The method of claim 12, wherein the generator has a rated power of 43 kW or more.

17. The method of claim 12, the electric vehicle including a fuel tank, wherein fuel from the fuel tank is utilized for the operation of the engine of the truck-mount cleaning system.

* * * * *